(12) United States Patent
Mack et al.

(10) Patent No.: US 9,073,128 B2
(45) Date of Patent: Jul. 7, 2015

(54) DRILLING TOOL

(75) Inventors: Thomas Mack, Fürth (DE); Tamir Sherif, Gößweinstein (DE)

(73) Assignee: KENNAMETAL INC., Latrobe, PA (US)

( * ) Notice: Subject to any disclaimer, the term of this patent is extended or adjusted under 35 U.S.C. 154(b) by 252 days.

(21) Appl. No.: 13/155,613

(22) Filed: Jun. 8, 2011

(65) Prior Publication Data

US 2012/0009034 A1    Jan. 12, 2012

(30) Foreign Application Priority Data

Jul. 6, 2010   (DE) .......................... 10 2010 026 271

(51) Int. Cl.
*B23B 51/02*   (2006.01)

(52) U.S. Cl.
CPC ........... *B23B 51/02* (2013.01); *Y10T 408/9097* (2015.01); *Y10T 408/9095* (2015.01); *Y10T 408/907* (2015.01); *B23B 2251/02* (2013.01); *B23B 2251/14* (2013.01); *B23B 2251/44* (2013.01); *B23B 2251/50* (2013.01)

(58) Field of Classification Search
USPC .......................... 408/226, 227, 230, 231, 233
See application file for complete search history.

(56) References Cited

U.S. PATENT DOCUMENTS

| | | | |
|---|---|---|---|
| 465,392 A * | 12/1891 | Shippee ......................... | 408/230 |
| 4,913,603 A * | 4/1990 | Friedli et al. ................... | 408/230 |
| 5,297,456 A | 3/1994 | Nishimura | |
| 5,951,214 A | 9/1999 | Rothballer et al. | |
| 7,252,461 B2 | 8/2007 | Karonen | |
| 7,360,974 B2 | 4/2008 | Borschert et al. | |
| 2002/0159849 A1 | 10/2002 | Longden et al. | |
| 2005/0135887 A1 * | 6/2005 | Borschert et al. ............. | 408/230 |
| 2005/0249562 A1 * | 11/2005 | Frejd ............................. | 408/230 |
| 2007/0071559 A1 | 3/2007 | Koskinen | |
| 2007/0237594 A1 * | 10/2007 | Lang et al. ..................... | 408/230 |
| 2008/0199268 A1 * | 8/2008 | Krenzer et al. ............... | 408/230 |
| 2008/0232912 A1 | 9/2008 | Bhagath | |
| 2009/0016832 A1 * | 1/2009 | Onose et al. .................... | 408/59 |

(Continued)

FOREIGN PATENT DOCUMENTS

| | | |
|---|---|---|
| CN | 1258240 A | 6/2000 |
| CN | 1443619 A | 9/2003 |

(Continued)

OTHER PUBLICATIONS

English Abstract of DE 102006062429.*

(Continued)

*Primary Examiner* — Sunil K Singh
*Assistant Examiner* — Alan Snyder
(74) *Attorney, Agent, or Firm* — Larry R. Meenan

(57) ABSTRACT

The invention relates to a drilling tool (1) comprising a support shank (2) and an interchangeable cutting insert (3) which is fitted to the support shank (2) and which has an asymmetrical main lip (15) divided into a guide lip (10) having a supporting land (12) and a guide land (23) trailing the supporting land (12), and into a clearance lip (13) having a trailing clearance portion (14), wherein a guide land (28) and a supporting land (29) are formed on the lateral surface of the support shank (2) and continuously extend the guide land (23) and the supporting land (12), respectively, on the cutting insert (3) and additionally guide the drilling tool (1) on the inner wall of a drill hole during a drilling operation.

12 Claims, 5 Drawing Sheets

(56) References Cited

U.S. PATENT DOCUMENTS

| | | |
|---|---|---|
| 2009/0155004 A1 | 6/2009 | Jansson |
| 2010/0260567 A1 | 10/2010 | Kauper |
| 2011/0188956 A1* | 8/2011 | Mueller et al. ............ 408/230 |
| 2012/0009034 A1 | 1/2012 | Mack et al. |
| 2013/0028677 A1 | 1/2013 | Schwaegert et al. |
| 2013/0045058 A1 | 2/2013 | Schwagerl |

FOREIGN PATENT DOCUMENTS

| | | |
|---|---|---|
| CN | 1630569 A | 6/2005 |
| CN | 1809437 A | 7/2006 |
| CN | 101821044 A | 9/2010 |
| DE | 9320448 U1 | 7/1994 |
| DE | 19807609 A1 | 6/1999 |
| DE | 202005020931 U1 | 1/2007 |
| DE | 102006062429 A1 * | 7/2008 |
| DE | 10 2007 050 050 A1 | 4/2009 |
| DE | 10 2008 045 326 A1 | 2/2010 |
| DE | 102010006796 B4 | 12/2011 |
| EP | 502541 A1 | 9/1992 |
| EP | 672492 A1 | 9/1995 |
| EP | 1294515 B1 | 4/2005 |
| GB | 1395855 A * | 5/1975 |
| JP | 51087794 U | 7/1976 |
| JP | 08155713 A * | 6/1996 |
| JP | 08300214 A | 11/1996 |
| JP | 09207007 A | 8/1997 |
| JP | 2905555 B2 | 6/1999 |
| JP | 11179611 A | 7/1999 |
| JP | 2004001219 A | 1/2004 |
| JP | 2005-517539 A | 6/2005 |
| JP | 2007144526 A | 6/2007 |
| JP | 2009056534 A | 3/2009 |
| WO | 9635538 A1 | 11/1996 |
| WO | 0136134 A1 | 5/2001 |
| WO | 2011095344 A1 | 8/2011 |
| WO | 2011097109 | 8/2011 |

OTHER PUBLICATIONS

English translation of DE 102006062429.*
German Office Action (no translation available), dated Apr. 7, 2011, for corresponding German Application No. 10 2010 026 271.4-14, 3 pages.
10-10-2014-K-2936DECN1-OA1pdf.
K-2936DEDE1 Second Office Action dated Sep. 16, 2014.
Japanese Patent Office, "Office Action for Japanese Patent Appl. No. 2011-144238" (with English language translation), Mar. 31, 2015, 8 pp.

* cited by examiner

DRILLING TOOL

BACKGROUND

1. Field of the Invention

The invention relates to a tool with which rotationally symmetrical and in particular cylindrical apertures can be made in a workpiece in a machining production method, in short a drilling tool.

2. Background Information

Conventional drilling tools can be of both one-part and multi-part design. Multi-part drilling tools which are composed of a support shank and a cutting insert interchangeably fitted to the support shank, that is to say of two main components, are especially common. The multi-part drilling tools offer the advantage, inter alia, that, in the event of wear or damage, the complete drilling tool does not have to be exchanged, but rather only the components affected. The invention explained herein is based on this type of multi-part drilling tool.

A high machining quality is desired in particular during the finish machining of workpieces. In the case of a drilling tool, good concentric running properties are a prerequisite for a correspondingly high machining accuracy.

A very advantageous drilling tool embodiment in this respect is disclosed in DE 10 2006 025 294 A1 originating from the applicant. Said document discloses a one-part drilling tool having a drill region or drilling head, in which drilling tool the elements in the drill region or on the drilling head, which guide the drilling tool on an inner wall of the drill hole, are configured asymmetrically with respect to the rotation thereof about the center longitudinal axis. With this asymmetry, disadvantageous vibration resonances (i.e., "chatter") can be avoided.

A further, hitherto unpublished patent application having the DPMA reference DE 2009 012 725 and originating from the applicant relates to a drilling tool composed of a tool shank and a cutting insert which can be fixed thereto. In such a two-part drilling tool, the cutting insert has the function of the tool head of a one-part drilling tool and accordingly carries the cutting and the guiding elements of the two-part drilling tool. The basic principle of the asymmetrical configuration of the drilling head has been adapted to the modular construction of a two-part drilling tool.

SUMMARY OF THE INVENTION

The present invention improves upon known drills by providing a multi-part drilling tool with further-improved concentric running properties.

Such improvement is achieved in an inventive manner by the combination of features in claim 1. The dependent claims contain partly advantageous developments of this invention and partly developments of this invention that are inventive on their own.

In a drilling tool produced according to the teaching of this invention, an interchangeable cutting insert is fitted to a support shank. Both main components, which are to be offered separately for the end user market, can be produced both from one piece and from a plurality of parts. The cutting insert has an asymmetrical main lip which is split in two into a guide lip and into a clearance lip. The guide lip is provided with a supporting land and with a guide land trailing the supporting land. The clearance lip leads a clearance portion. A guide land and a supporting land are likewise provided in a complementary manner on the lateral surface of the support shank. The guide land and supporting land extend the respective guide land and the respective supporting land on the cutting insert continuously and therefore—within the limits of the production tolerances—seamlessly. As a result of the lands which go beyond the cutting insert into the support shank, the drilling tool, during the drilling operation, is guided on the inner wall of the drill hole not only in the region of the cutting insert but also in the region of the support shank, as a result of which the concentric running properties of the drilling tool are further improved. Both the supporting lands, which go from the cutting insert into the support shank and are assigned to the lips, and the guide land act as guide elements in the region of the support shank. The effect of the lands in the region of the support shank is comparable with the effect of guide elements on rotating tools of a different kind.

According to a preferred embodiment, the guide land and the supporting land define a secondary flank lying in between. In this way, it is possible to vary the peripheral effective region of the guide land relative to the position of the two parts of the main lip and thus relative to the position of the two lip corners defining the partial lips independently of the characteristic width of the lands, that is to say to displace the effective region on a circumferential circle of a drilling tool cross section. The drilling tool can thus be balanced in an especially simple manner with respect to its rotational movement.

In addition, in this connection, the characteristic widths of the guide land and of the supporting land can expediently be established independently of one another, for the characteristic width of the supporting land depends substantially on the loading, to be expected, of the lip to be supported, whereas the characteristic width of the guide land is intended to optimize the concentric running properties.

In addition, an embodiment is advantageous in which, in addition to the guide land, the supporting land and the two lip corners guide the drilling tool on the inner wall of the drill hole during the drilling operation. In this case, these guiding elements are preferably arranged on a virtual circumferential circle on the drilling tool in such a way that the smallest circle circumference segment connecting all the elements defines an angle greater than 180°. Thus, the drilling tool, despite an asymmetrical configuration, can be guided to the greatest possible extent free of play and in a radially centered manner in the drill hole. In addition, secondary lips can be provided, which secondary lips adjoin the lip corners in the axial direction and likewise help to guide the drilling tool. Furthermore, it is conceivable to provide lands having an additional guiding and supporting effect, for example next to a secondary lip adjoining the clearance lip.

Since drilling tools according to the invention are mainly produced as drilling tool inserts for machines, a clamping region is normally provided on the support shank, the clamping region being clamped in a chuck for connecting the drilling tool to a machine. In many cases, this clamping region corresponds to the unmachined region of the cylindrical drilling tool blank and accordingly has a uniform diameter. The machined or fluted region of the support shank interacts with the cutting insert as an actual tool and can be varied in its radial extent along the center longitudinal axis in accordance with the application.

An embodiment is preferred in which the support shank in the fluted region which directly adjoins the cutting insert has a constant diameter and then tapers in the direction of the clamping region, a reduction in the nominal diameter of 1% to 2% being considered to be perfectly suitable. That fluted region of constant diameter, which directly adjoins the cutting insert, supports, with the guiding elements thereof, the guiding elements on the cutting insert. The axial extent of this supporting region can be adapted, for example, to the intended drill hole depths which are to be produced with a drilling tool. In this case, it is necessary to take into account the fact that, on the one hand, as exact a guidance of the drilling tool as possible is to be ensured, on which guidance an increasing extent of the supporting region has an advantageous effect, and that, on the other hand, a low degree of material-abrading friction, which increases with increasing extent of the supporting region, is desired between the guide elements and the inner wall of the drill hole. In this connection, it has proved to be very expedient to restrict the supporting region to up to 50% with respect to the axial length of the fluted region.

In addition, it is advantageous if the flutes are incorporated helically into the drilling tool. In this case, the focus is on an efficient chip disposal. Therefore, depending on the material to be cut, it may be helpful to design the helix angle of the flutes to be variable in the axial direction.

According to a preferred embodiment, however, the chip forming is substantially effected in two chip spaces at the cutting insert. These chip spaces contain chip-forming surfaces and are an integral part of the cutting insert. Assigned to both parts of the main lip is a respective chip space which leads this main lip part and which is, in turn, extended continuously by a flute on the support shank.

On account of the asymmetrical form of the cutting insert, the two chip spaces likewise have geometries differing from one another. In order to promote the chip disposal, the respective geometry of each chip space is preferably continued and continuously extended by the corresponding flute on the support shank.

As already mentioned at the beginning, the main components, that is to say the support shank and the cutting insert in the two-part drilling tool, can in turn be produced from a plurality of parts. This may be advantageous, for example, when the cutting and/or the guiding elements are to be produced from a special material, since the complete main component does not then have to be produced from this usually higher-grade material. In addition, it is thereby also possible to use various materials for the cutting and for the guiding elements and thus combine them in accordance with the specific applications. For example, a drilling tool made completely of high-speed steel can thereby be used in adaptation to a specific intended use, or the cutting and/or guiding elements can each be produced from a special material, such as, for example, high-speed steel, ceramic or cermet, and can be fixed to a drilling tool parent body produced from a simple tool steel. The type of fixing, for example adhesively bonding in place or brazing in place, is in this case adapted to the materials used.

In addition to the use of different materials for the individual tool parts, various subsequent treatments for improving the tool properties are also suitable. In this connection, the possibility of specifically subsequently treating or refining individual regions or functional elements should especially be emphasized. For example, it is advantageous for the chip disposal to smooth the surfaces of the flutes by grinding and polishing. A similar production process step for the guide elements is likewise appropriate. In this case, improved sliding ability is thus achieved, which in turn results in a lower degree of friction. Finally, it is also possible to harden or coat the drilling tool or else individual regions or functional elements. A coating can in this case both replace and supplement separate production of the cutting and/or guiding elements from a special material differing from the material of the drilling tool parent body. Accordingly, materials such as high-speed steel, ceramic or cermet are also suitable for coating.

BRIEF DESCRIPTION OF THE DRAWINGS

A full understanding of the invention can be gained from the following description of the preferred embodiments when read in conjunction with the accompanying drawings in which.

Parts corresponding to one another are provided with the same designations in all the figures.

DESCRIPTION OF THE PREFERRED EMBODIMENTS

Figure 1:
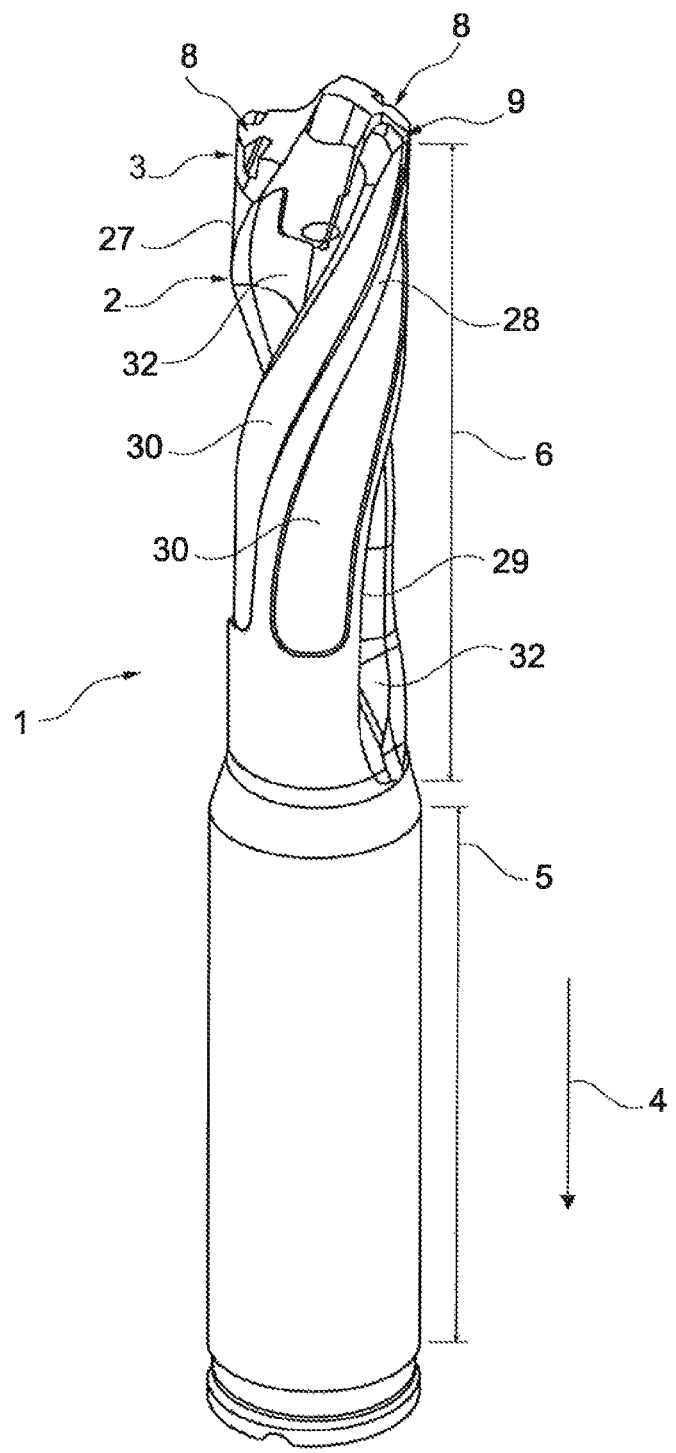
FIG. 1 shows a drilling tool according to an embodiment of the invention in a perspective view.
Figure 2:
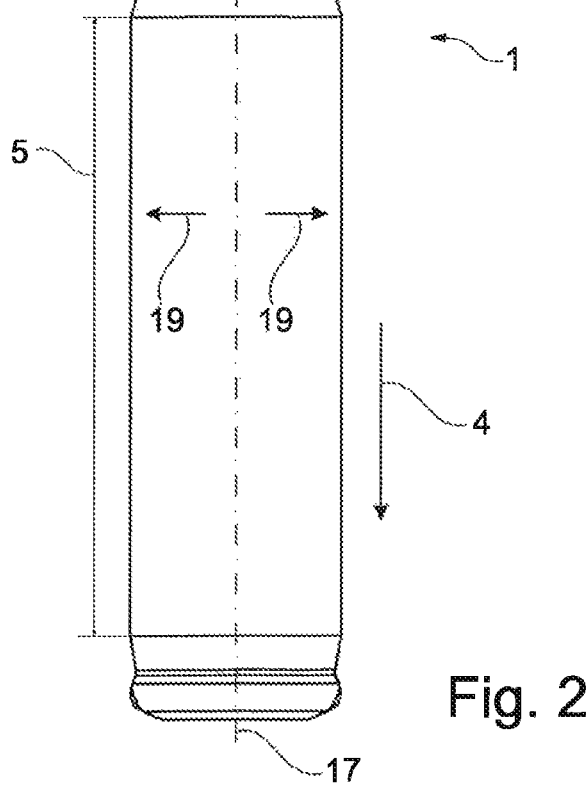
FIG. 2 shows a drilling tool according to an embodiment of the invention in a side view.
Figure 3:
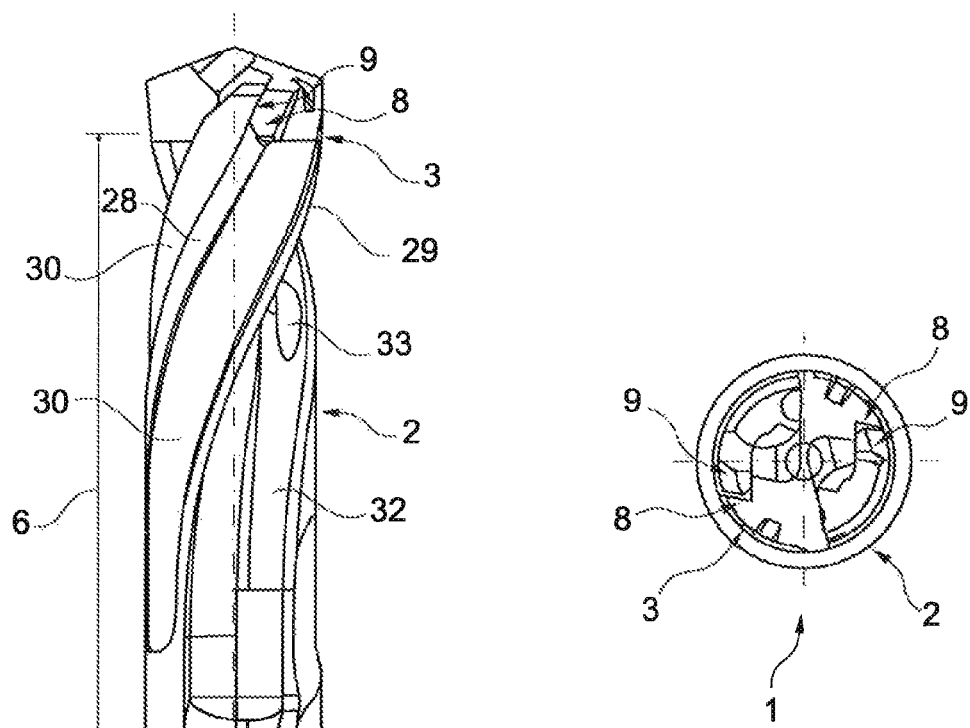
FIG. 3 shows a drilling tool according to an embodiment of the invention in a plan view.

A drilling tool 1 according to an embodiment of the invention is shown in a perspective view in FIG. 1, in a side view in FIG. 2 and in a plan view in FIG. 3. The drilling tool 1 is composed of a support shank 2 and of a cutting insert 3 fitted to the support shank 2. In the axial direction 4, the support shank 2 has essentially two different functional regions—a cylindrical clamping region 5 of constant diameter, which is clamped in a chuck (not depicted) for connecting the drilling tool 1 to a machine, and a fluted region 6 which has a maximum radial extent varying in the axial direction 4 and which functions together with the cutting insert 3 as an actual cutting tool.

Figure 4:
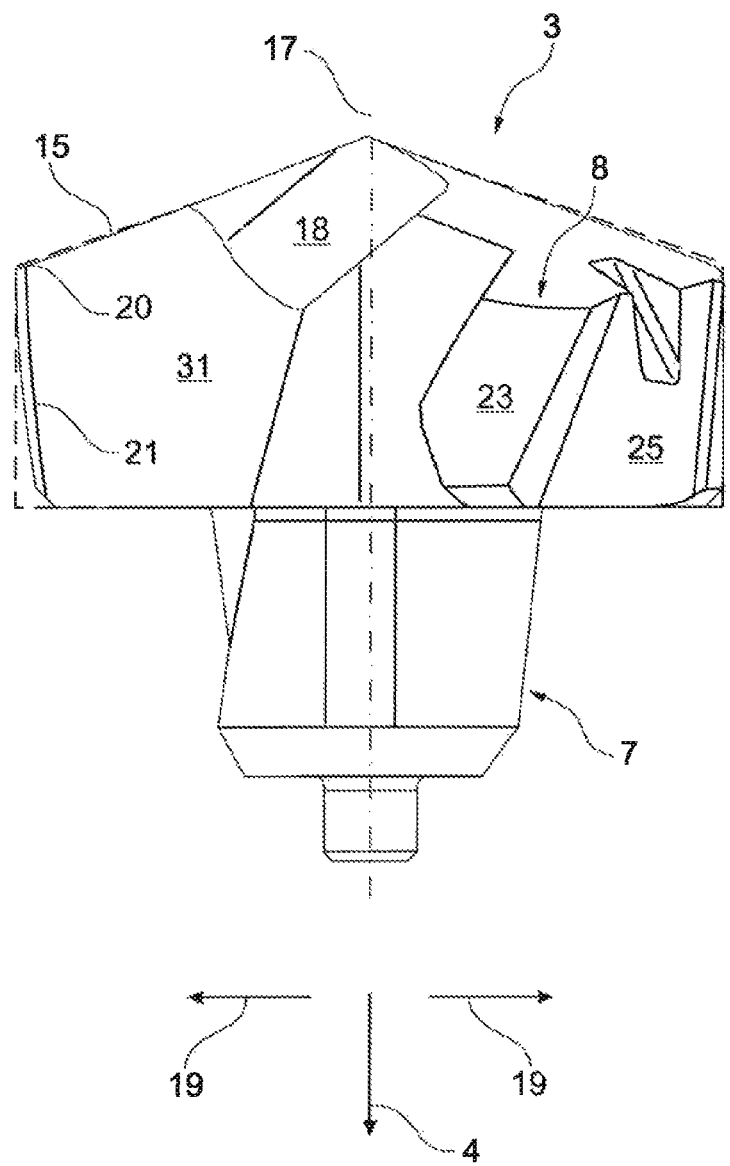
FIG. 4 shows a cutting insert according to an embodiment of the invention in a side view.
Figure 5:
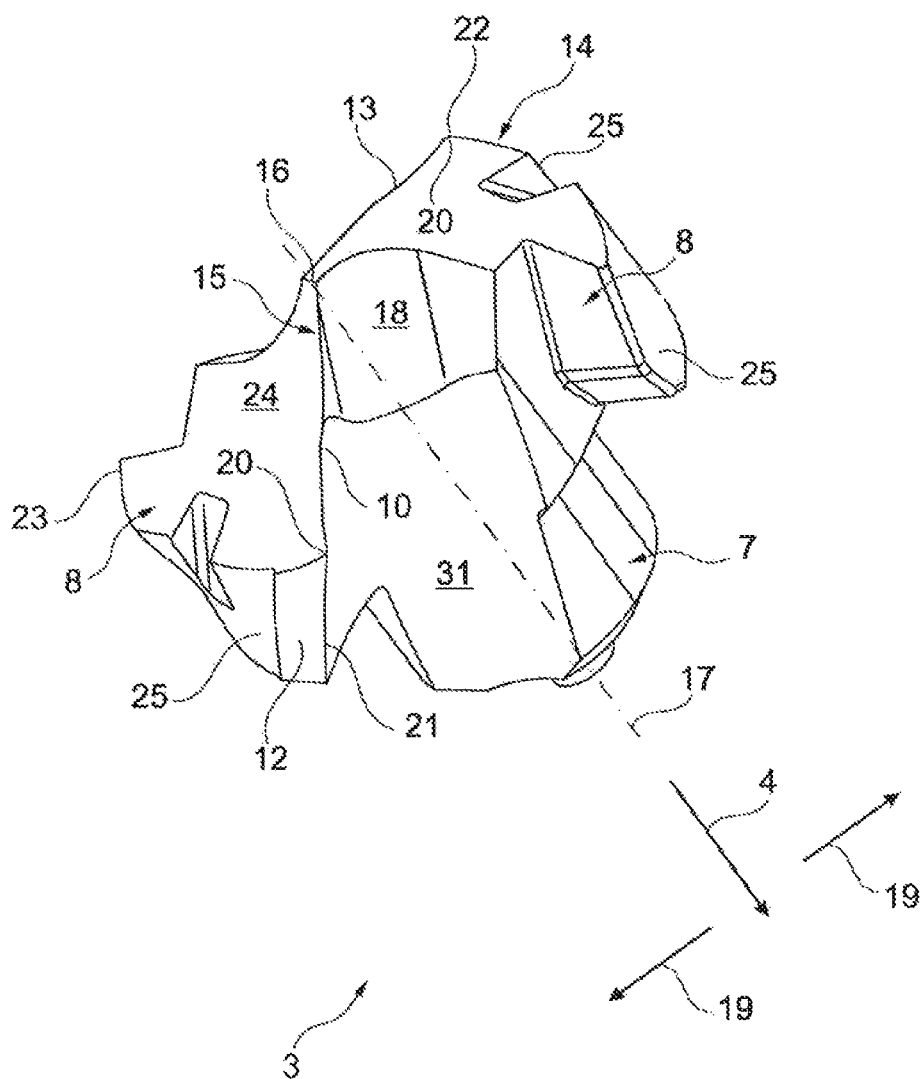
FIG. 5 shows a cutting insert according to an embodiment of the invention in a perspective view.
Figure 6:
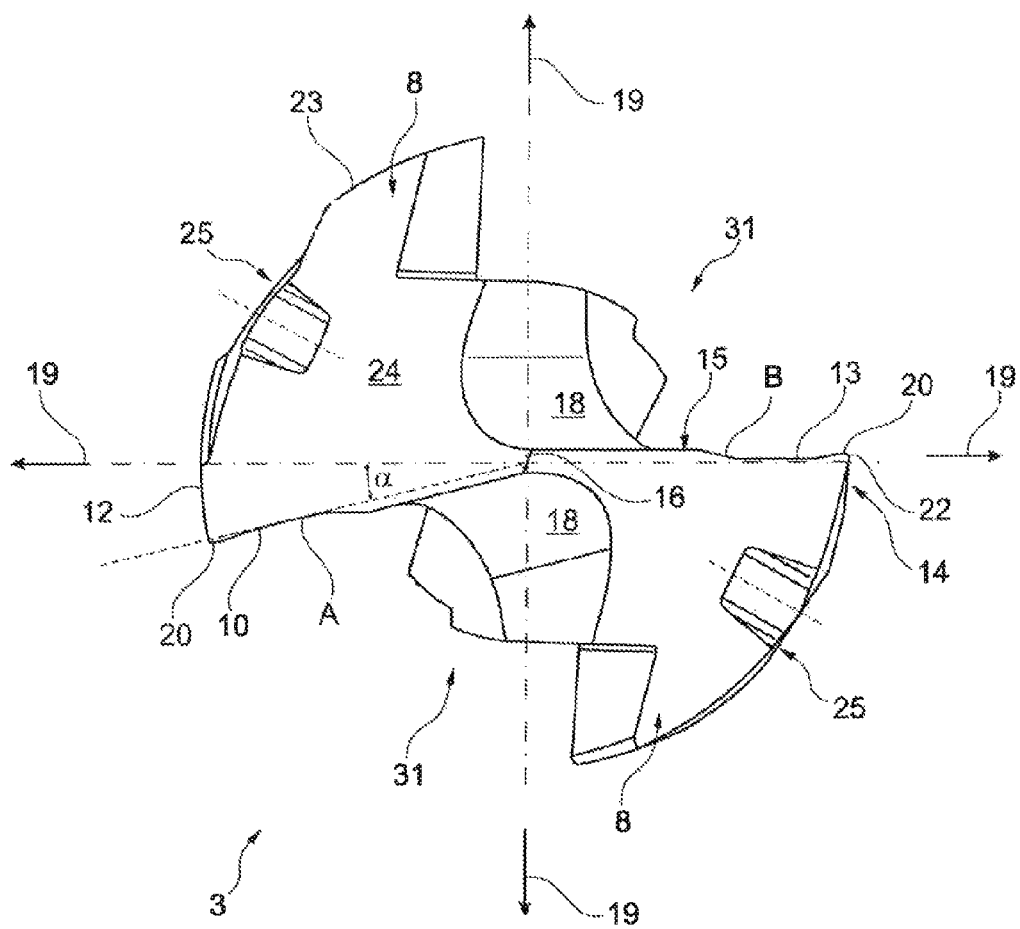
FIG. 6 shows a cutting insert according to an embodiment of the invention in a plan view.

Arranged on the end of the fluted region 6 which is remote from the clamping region 5 is the cutting insert 3, which can be seen separately from various perspectives in FIG. 4 to FIG. 6. In simple terms, the cutting insert 3 is fixed to the support shank 2 by inserting a fastening pin 7, integrally formed on the cutting insert 3, into a central recess (not shown) in the end face of the support shank 2 and by pressing two peripherally arranged lobes 8 on the cutting insert 3 into correspondingly formed receptacles 9 on the support shank 2 on the basis of a rotation of the cutting insert 3 relative to the support shank 2. The details of this fastening can be seen from patent document EP 1 476 269 B1, which comes from the applicant, the disclosure of which is incorporated by reference herein.

The configuration of the cutting insert 3, in particular the cutting edge geometry, is likewise based on inventions of the applicant. These inventions are described in DE 10 2006 025 294 A1 and in DE 2009 012 725 already mentioned and not yet published, the contents of which are also incorporated by reference herein.

Accordingly, the cutting insert 3 has an asymmetrical main lip 15 split in two into a guide lip 10 having a supporting land 12 and a guide land 23 trailing the supporting land 12 and into a clearance lip 13 having a trailing clearance portion 14. It should be noted here that, depending on the point of view, it is also possible to refer to two main lips A, B connected to one another by a chisel edge 16, instead of a two-part main lip 15. Both alternatives are common in the corresponding technical literature.

In the case of the exemplary embodiment, the asymmetry of the main lip 15 is produced by one part of the main lip 15 being swung by an angle α (FIG. 5), which is about 13° here, relative to its symmetrical position. This symmetrical position corresponds in this case to a position relative to the other part of the main lip at which an imaginary 180° rotation of the one part of the main lip about the center longitudinal axis 17 of the drilling tool 1 leads to a congruent superimposition with the other part of the main lip. However, the shapes of the end cutting edges of the two main lip parts show no relevant differences and are each substantially characterized by adjoining machined point thinning 18.

The asymmetrical design of the cutting insert 3 is continued consistently by the further cutting and guiding elements provided. Secondary lips 21 adjoin the lip corners 20 in the axial direction 4, the lip corners 20 peripherally defining the two parts of the main lip 15, in each case in the radial direction 19. A respective supporting land 12, 22 is assigned to both secondary lips 21. A guide land 23 is integrally formed peripherally on the lobe 8, which is connected to the guide lip 10 via a main flank 24. This guide land 23 has a significantly larger characteristic width than the two supporting lands 12, 22. All the other peripheral or secondary flanks 25 of the cutting insert 3 without a cutting or guiding effect are reduced in the radial extent thereof relative to the secondary lips 21 or the lands 12, 22, 23 on the cutting insert 3. In this way, the risk of canting or seizing of the drilling tool 1 is kept low.

Three guiding lands are likewise provided on the support shank 2. These are the guide land 28 and the two supporting lands 27, 29. These lands complement the corresponding lands 12, 22, 23 on the cutting insert 3 and form a continuous development. In interplay, the guide lands 23, 28 and the supporting lands 12, 22, 27, 29 of cutting insert 3 and support shank 2 thus guide the drilling tool 1 on the inner wall of the drill hole during the drilling operation. In analogy to the cutting insert 3, secondary flanks 30 having a reduced radial extent are provided between the lands 27, 28, 29 of the support shank 2. The region of the support shank 2 which actively guides the drilling tool 1 corresponds, in the exemplary embodiment, approximately to the first third, adjoining the cutting insert 3, of the fluted region 6. In that third, the support shank 2 has a constant radial extent. After that, the support shank 2 tapers in the axial direction 4. Outside the guiding region of the support shank 2, the guide land 28 and the supporting lands 27, 29 have no technical function, and so the geometry thereof may be varied there, for example, for the benefit of a simplified production process.

Furthermore, the shaping of two chip spaces 31 is essential for the asymmetrical configuration of the cutting insert 3. One chip space 31 each is incorporated into the cutting insert 3 in such a way as to lead one part each of the main lip 15. The chips are formed in the chip spaces 31 during the drilling operation. The walls of the chip spaces 31 thus form chip-forming surfaces. To ensure as effective a chip disposal as possible, the flutes 32 formed in the support shank 2 are adapted in their configuration to the chip spaces 31. In this way, the flutes 32 also extend the chip spaces 31 in the axial direction 4 continuously and—apart from production tolerances—seamlessly. The asymmetrical design of the chip spaces 31 and accordingly of the flutes 32 originates in turn from the asymmetry of the main lip 15 and from the angle α resulting therefrom, which in the exemplary embodiment is about 13°. The corresponding swing of the main lip 15 by the angle α is compensated for on the support tool by the flutes being correspondingly adjusted continuously by the magnitude of the angle α. Outlet openings 33 of cooling passages open into the flutes 32 on the support shank 2. These cooling passages serve to introduce a cooling lubricant into the drill hole during the cutting process. This configuration of the cooling passages with the outlet openings 33 thereof opening out into the flutes 32 is the subject matter of the applicant's European Patent Application EP 16 48 642 B1, the contents of which are incorporated by reference herein.

In summary, the invention enables any desired asymmetrical configuration of the cutting insert 3 to be combined with a correspondingly adapted support shank 2, the support shank in this case being provided with guide elements which also control and thereby improve the concentric running behavior of the drilling tool.

While specific embodiments of the invention have been described in detail, it will be appreciated by those skilled in the art that various modifications and alternatives to the details provided herein could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A drilling tool comprising:
   a support shank including a fluted region having a number of flutes formed therein, a central recess formed in an end face of the fluted region, and a pair of receptacles formed adjacent the central recess; and
   an interchangeable cutting insert having a fastening pin, a pair of peripherally arranged lobes, an asymmetrical main lip divided into a guide lip and a clearance lip each being associated with a respective one of the peripherally arranged lobes, the guide lip having a supporting land and a guide land trailing the supporting land formed on the peripherally arranged lobe associated therewith, and the clearance lip having a trailing clearance portion formed on the peripherally arranged lobe associated therewith,
   wherein the fastening pin is disposed in the central recess and each lobe of the peripherally arranged lobes is disposed in a respective one of the receptacles,
   wherein a guide land and a supporting land are formed on the lateral surface of the support shank and each extend to a radial extent generally equal to the guide land and supporting land such that the guide land and the supporting land continuously extend the guide land and the supporting land, respectively, of the cutting insert,
   wherein the guide land and supporting land are structured to guide the drilling tool on the inner wall of the drill hole during a drilling operation,
   wherein the guide land and the supporting land define a secondary flank having a reduced radial extent relative to the supporting land and the guide land extending from the supporting land to the guide land, and
   wherein the guide land and one of the number of flutes define a second secondary flank therebetween, the second secondary flank extending along the receptacle of the support shank in which the lobe of the cutting insert associated with the guide lip is disposed therein.

2. The drilling tool as recited in claim 1, wherein the widths of the guide land and of the supporting land deviate from one another.

3. The drilling tool as recited in claim 1, wherein the region which adjoins the clearance lip in the axial direction is provided with a supporting land structured to guide the drilling tool on the inner wall of the drill hole during the drilling operation.

4. The drilling tool as recited in claim 1, wherein the support shank is divided into a fluted region having the number of flutes adjoining the cutting insert and a clamping region adjoining the fluted region, and wherein the fluted region has a constant radial extent following the cutting insert and tapers in radial extent at the end thereof adjoining the clamping region.

5. The drilling tool as recited in claim 4, wherein, with respect to the axial length of the fluted region, up to 50% of the fluted region has a constant diameter.

6. The drilling tool as recited in claim 5, wherein the number of flutes in the fluted region are of one or both of a constant or varying helical configuration.

7. The drilling tool as recited in claim 6, wherein the cutting insert comprises two chip spaces and wherein two flutes on the support shank continuously extend the geometry of the chip spaces.

8. The drilling tool as recited in claim 7, wherein the two chip spaces in the cutting insert are of a different geometry and two flutes on the support shank continuously extend the different geometries of the chip spaces.

9. The drilling tool as recited in claim 1, wherein the guide land of the insert and the guide land of the support shank are one of adhesively bonded or brazed thereon.

10. The drilling tool as recited in claim 9, wherein the guide land of the insert and the guide land of the support shank are formed from a different material than at least one of the insert and the support shank.

11. The drilling tool as recited in claim 1, wherein the guide lands comprise a coating thereon.

12. A support shank comprising:
   a clamping region structured to be clamped in a chuck;
   a central recess disposed opposite the clamping region;
   a first receptacle and a second receptacle disposed adjacent to, and extending from, the central recess, the central recess structured to house a fastening pin of a cutting insert and each receptacle being structured to house a respective lobe formed on the cutting insert for forming a multi-part drilling tool;
   a first flute and a second flute formed in a lateral surface of the support shank;
   a supporting land formed on a lateral surface of the support shank adjacent the first flute, the supporting land extending from the clamping region to the first receptacle;
   a guide land formed on the lateral surface of the support shank, the guide land extending from the clamping region to the first receptacle;
   a first secondary flank having a reduced radial extent relative to the supporting land and the guide land and extending between the supporting land and the guide land and from the clamping region to the first receptacle; and
   a second secondary flank-having a reduced radial extent relative to the guide land disposed and extending between the guide land and the second flute and from the clamping region beyond the guide land and along the first receptacle, and
wherein the supporting land and the guide land are disposed on the shank to continuously extend, respectively, from a supporting land and a guide land formed on the cutting insert when the cutting insert is housed in the end portion of the supporting shank.

* * * * *